(12) United States Patent
Finger et al.

(10) Patent No.: US 10,769,316 B2
(45) Date of Patent: Sep. 8, 2020

(54) PROTECTING MOBILE DEVICES FROM UNAUTHORIZED DEVICE RESETS

(71) Applicant: T-Mobile USA, Inc., Bellevue, WA (US)

(72) Inventors: Joshua Finger, Covington, WA (US); Kimberly Bylund, Seattle, WA (US); Yasmin Karimli, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 272 days.

(21) Appl. No.: 15/282,605

(22) Filed: Sep. 30, 2016

(65) Prior Publication Data
US 2018/0096174 A1    Apr. 5, 2018

(51) Int. Cl.
| | | |
|---|---|---|
| *G06F 21/88* | (2013.01) | |
| *G06F 21/31* | (2013.01) | |
| *G06F 21/62* | (2013.01) | |
| *G06F 21/44* | (2013.01) | |
| *H04W 4/50* | (2018.01) | |
| *H04L 29/08* | (2006.01) | |

(52) U.S. Cl.
CPC .............. *G06F 21/88* (2013.01); *G06F 21/31* (2013.01); *G06F 21/44* (2013.01); *G06F 21/629* (2013.01); *H04W 4/50* (2018.02); *H04L 67/34* (2013.01)

(58) Field of Classification Search
CPC .......... G06F 21/88; G06F 21/31; G06F 21/44; G06F 21/629; H04W 4/50; H04L 67/34
See application file for complete search history.

(56) References Cited

U.S. PATENT DOCUMENTS

| | | | |
|---|---|---|---|
| 2002/0016838 A1 | 2/2002 | Geluc et al. | |
| 2003/0153328 A1* | 8/2003 | Booth | G06F 21/88 455/456.1 |
| 2005/0143059 A1* | 6/2005 | Imura | G06F 21/78 455/419 |
| 2009/0006867 A1* | 1/2009 | Choyi | G06F 21/88 713/193 |
| 2010/0216429 A1* | 8/2010 | Mahajan | G06F 21/6245 455/411 |
| 2011/0086612 A1 | 4/2011 | Montz et al. | |
| 2012/0290421 A1* | 11/2012 | Qawami | G06Q 20/20 705/21 |
| 2013/0078951 A1* | 3/2013 | Mun | G06F 21/305 455/411 |
| 2013/0205134 A1* | 8/2013 | Holtmanns | H04W 12/04 713/156 |
| 2014/0364099 A1 | 12/2014 | Pai et al. | |

(Continued)

OTHER PUBLICATIONS

International Searching Authority, International Search Report and Written Opinion, PCT Patent Application PCT/US2017/054499, dated Jan. 17, 2018, 14 pages.

*Primary Examiner* — Catherine Thiaw
(74) *Attorney, Agent, or Firm* — Perkins Coie LLP

(57) ABSTRACT

Systems and methods are described herein for authorizing master resets (e.g., factory resets) of mobile devices, such as smart phones, tablets, and so on. In some embodiments, the systems and methods employ a server-based authorization schema or mechanism, where at least one step or operation is performed, or caused to be performed, by a server or other system that is remote from the mobile device being reset.

19 Claims, 5 Drawing Sheets

(56) References Cited

U.S. PATENT DOCUMENTS

| | | | |
|---|---|---|---|
| 2014/0372743 A1* | 12/2014 | Rogers | H04L 9/3234 713/2 |
| 2014/0373184 A1* | 12/2014 | Mahaffey | H04W 12/1206 726/35 |
| 2015/0094023 A1 | 4/2015 | Abramson et al. | |
| 2016/0105763 A1* | 4/2016 | Liu | H04W 4/02 455/411 |
| 2016/0154982 A1* | 6/2016 | Velusamy | H04L 63/20 455/411 |
| 2016/0285881 A1 | 9/2016 | Huber et al. | |

* cited by examiner

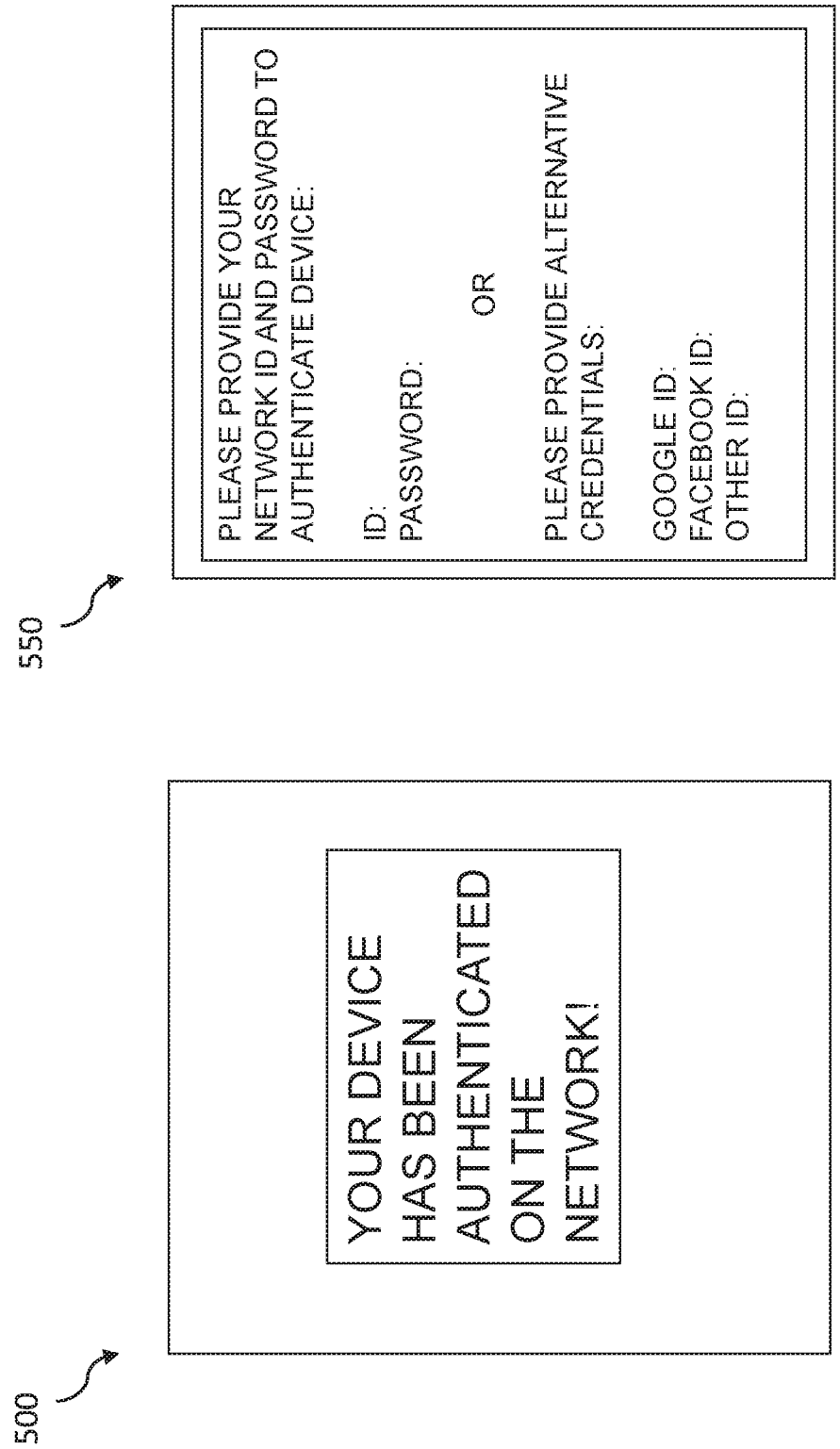

PROTECTING MOBILE DEVICES FROM UNAUTHORIZED DEVICE RESETS

BACKGROUND

Often, when a mobile device is stolen or otherwise acquired by an unauthorized user, the unauthorized user is able to perform a factory reset of the device, removing any and all information from the device and preventing the owner of the device from tracking, and possibly finding, his/her device. Currently, there are various device protection algorithms, such as locally-stored or application-based mechanisms, which attempt to prevent the factory reset of a device by an unauthorized user. These mechanisms authorize the reset after a user provides a password, biometric identifier, or other identification.

For example, an operating system (OS) based protection algorithm may maintain a token or other piece of data that prevents operation of the device (e.g., authorization of the device to a communications network) until a user provides authorization credentials (e.g., a username and password associated with a known email or messaging service for the user), at which time the token is removed, and the device is authorized. However, these tokens may be removed (and associated protection mechanisms bypassed) via OS hacks and other nefarious removal mechanisms. These devices are rendered unprotected and subsequently may be authorized to a network for users other than the original users (e.g., owners or purchasers) of the devices.

BRIEF DESCRIPTION OF THE DRAWINGS

Embodiments of the disclosed technology will be described and explained through the use of the accompanying drawings.

FIGS. 5A-5B are display diagrams illustrating example user interfaces presented by a mobile device during a master reset of the mobile device.

Figure 1:
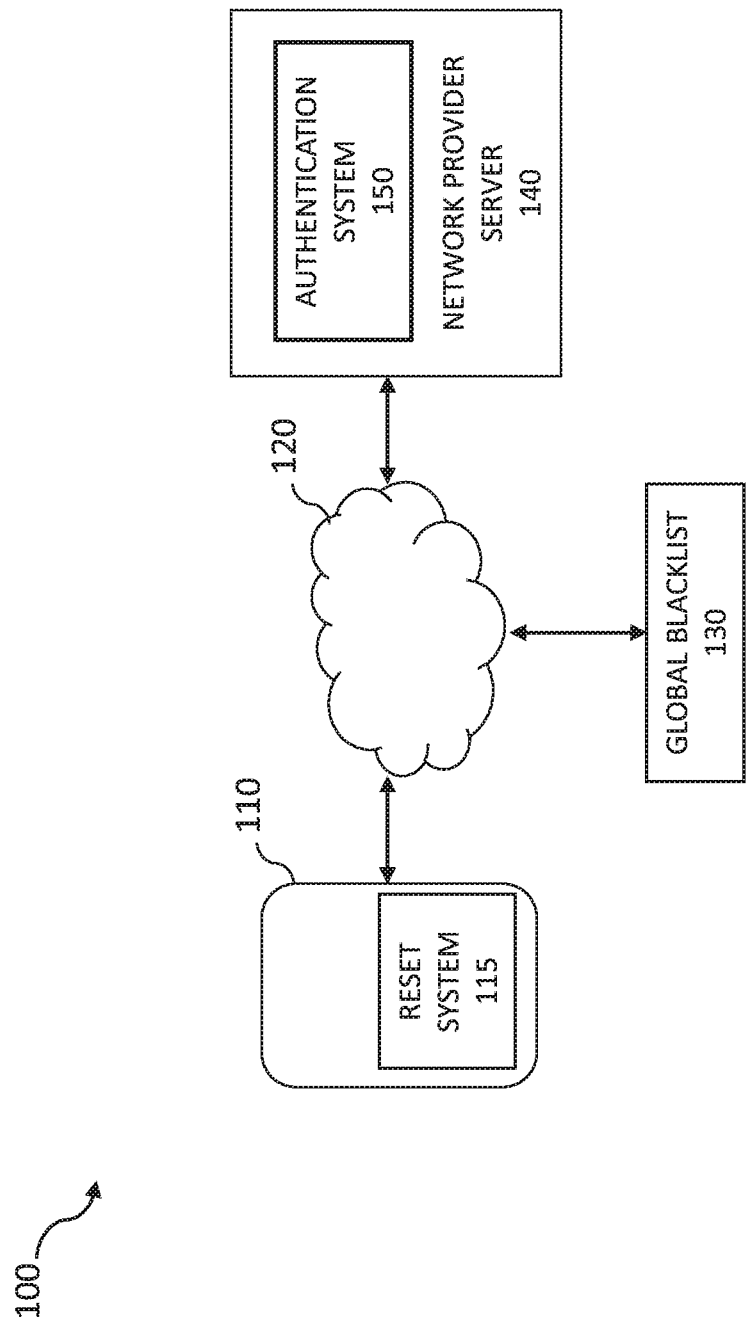
FIG. 1 is a block diagram illustrating a suitable computing environment for authorizing master resets for mobile devices.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for authorizing master resets (e.g., factory resets) of mobile devices, such as smart phones, tablets, and so on. In some embodiments, the systems and methods employ a server-based authorization schema or mechanism, where at least one step or operation is performed, or caused to be performed, by a server or other system that is remote from the mobile device being reset.

In some embodiments a server remote from a mobile device receives a token (or signal) from the mobile device. The token may be transmitted from an operating system of the mobile device to the server after invocation of a master reset operation at the mobile device. The server, which may be part of a network carrier providing a telecommunications network to the mobile device, extracts an identifier for the mobile device from the token, and identifies a status of the mobile device (e.g., "stolen" or "authorized") by comparing the extracted identifier to one or more databases associated with the server. After the comparison, the server transmits to the mobile device an authorization token to the operating system of the mobile device based on the identified status of the mobile device. For example, the authorization token may indicate the mobile device is authorized, stolen, or otherwise white- or black-listed.

In some embodiments, a mobile device may include a master reset system that performs master reset operations for the mobile device. For example, the master reset system transmits a token to a remote server in response to initiation of a master reset of the mobile device and completes the master reset of the mobile device upon receiving an authorization token from the remote server.

The systems and methods, therefore, protect mobile devices from unauthorized master resets, such as master resets performed after unauthorized users of mobile devices illegally obtain (e.g., steal or purchase) the devices. As described herein, the systems and methods improve upon conventional operating system, or other locally-implemented protection mechanisms, by moving one or more operations to remote servers in communication with the devices, where the servers are inaccessible to users attempting to perform unauthorized resets of the devices. The systems and methods, therefore, may maintain connections to the devices, and, in doing so, prevent devices from being lost or irretrievable to their original users, among other benefits.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

As described herein, the systems and methods utilize network-based components when authorizing and/or authenticating the status or ownership of a mobile device undergoing a master (e.g., factory) reset. FIG. 1 is a block diagram illustrating a suitable computing environment 100 for authorizing master resets for mobile devices.

A mobile device 110 provides a reset system 115, via the operating system (OS) of the mobile device 110, which performs reset operations when the device is prompted to perform a master reset, such as a factory reset. A master or factory reset restores the mobile device 110 to its original state, effectively erasing any information, applications, settings, and other information added to the original state of the device 110.

After the initiation or invocation of a master reset (in response to input received from a user associated with the device 110), the reset system 115 transmits, via the OS, one or more tokens (or, signal) over a network 120 to an authentication system 150 provided by a network server 140 or other server associated with a network carrier that provides the network 120.

Using the tokens, the authentication system 150 identifies the mobile device 110 and determines whether the mobile device 110 has been stolen or is otherwise associated with an unauthorized user. For example, the authentication system 150 may query one or more local or associated databases (e.g., database of whitelisted or blacklisted devices) storing information for devices associated with subscribers of the network 120, and/or may query other databases that contain information associated with mobile devices associated with subscribers to other networks, such as a global blacklist database 130 of devices known to be stolen or otherwise compromised.

FIG. 1 and the discussion herein provide a brief, general description of the components of the computing environment 100. Although not required, aspects of the computing environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 110 may include network communication components that enable the devices to communicate with remote servers or other portable electronic devices by transmitting and receiving wireless signals using a licensed, semi-licensed, or unlicensed spectrum over communications network, such as the network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing LTE, 3G and/or 4G wireless protocols. If the mobile device 110 is configured to communicate over another communications network, the mobile device 110 may include other components that enable it to be identified on the other communications networks.

In some embodiments, the mobile device 110 may include components that enable them to connect to a communications network using Generic Access Network (GAN), Unlicensed Mobile Access (UMA), or LTE-U standards and protocols. For example, the mobile device 110 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE) network, or other communications network. Further, the communications network 120 may include or be part of a wireless communications network, such as an Internet Multimedia System (IMS) network or other wireless networks.

Examples of Authorizing a Master Reset of a Mobile Device

As described herein, in some embodiments, the systems and methods prevent unauthorized resets of compromised mobile devices, such as stolen mobile devices, by providing network-based authentication of the mobile devices during master reset operations.

Figure 2:
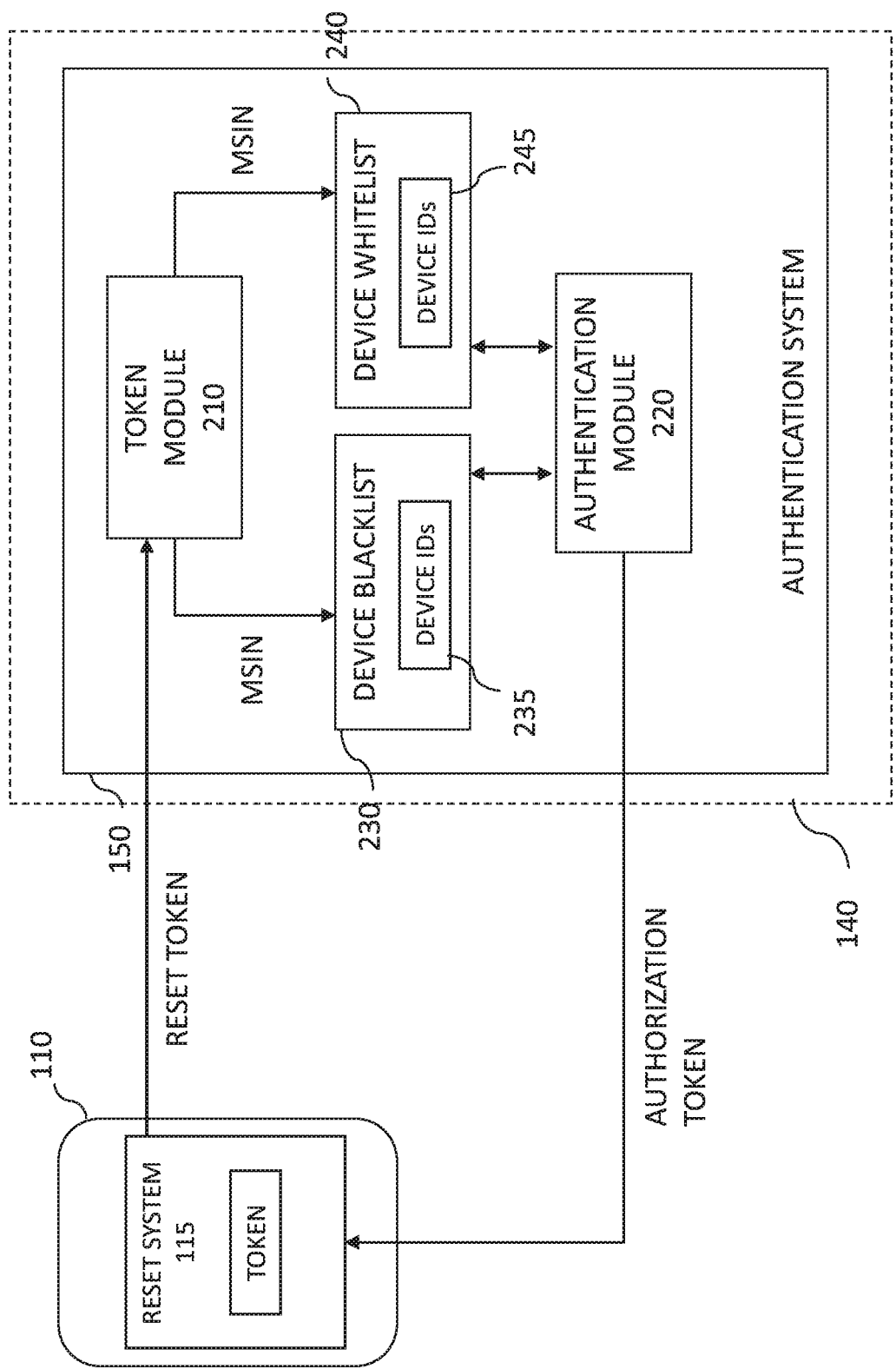
FIG. 2 is a block diagram illustrating the components of a reset authentication system.

FIG. 2 is a block diagram illustrating the components of the authentication system 150 and mobile device 110, which may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the authentication system 150 may include a token module 210 and an authentication module 220.

In some embodiments, the token module 210 is configured and/or programmed to receive a token from the mobile device 110 after invocation of a master reset operation at the mobile device 110. Before receiving the token from the mobile device 110, the token module 210 may receive information indicating the mobile device 110 has been stolen (from a user associated with the mobile device).

Based on the information, the token module 210 stores an identifier for the mobile device 110, extracted from the token, in a database of blacklisted devices, such as device blacklist database 230, which contains device identifiers 235 for blacklisted devices, such as devices known to be stolen. Similarly, a device whitelist database 240 may include device identifiers 245 for whitelisted devices, such as devices known to be possessed by their owners (e.g., subscribers of the network 120). The authentication system 150 may utilize the information stored in one or both of the databases 230, 240 when determining whether a mobile device is stolen or authorized.

In some embodiments, the authentication module 220 is configured and/or programmed to identify a status of the mobile device 110 by comparing the extracted identifier to the one or more databases 230, 240 associated with the server 140. Further, the authentication module 220 transmits to the mobile device 110 an authorization token or other authorization information to the operating system of the mobile device 110 based on the identified status of the mobile device 110.

For example, when an identifier for the mobile device 110 is contained within the device whitelist 240 (or, not contained in the device blacklist 230), the authentication module 220 may transmit an authorization token to the operating system of the mobile device 110 that causes the mobile device to complete the master reset operation at the mobile device 110. The identifier for the mobile device can be any GUID, such as the device's MAC, IMSI, and so on.

Further, when the identifier for the mobile device 110 is contained within the device blacklist 230 (or, not contained in the device blacklist 240), the authentication module 220 may transmit an authorization token to the operating system of the mobile device 110 that causes the mobile device to request credentials from a user associated with the mobile device 110 before the mobile device 110 completes the master reset operation at the mobile device 110 and/or connects to services provided by the network 120.

Figure 3:
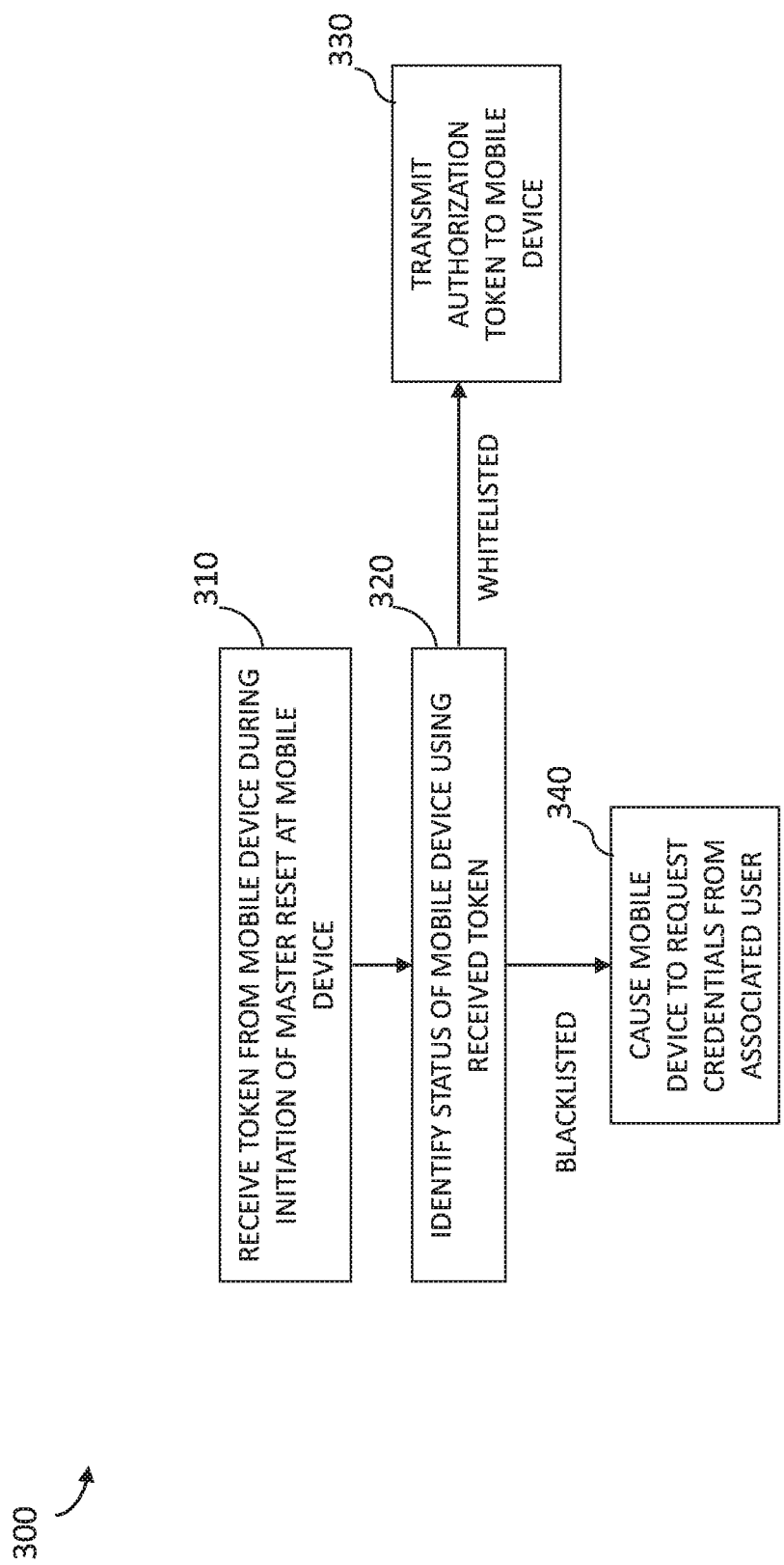
FIG. 3 is a flow diagram illustrating a method for authorizing a reset action for a mobile device at a server remote from the mobile device.

Thus, the authentication system 150 performs various network-based operations when authorizing resets of devices. FIG. 3 is a flow diagram illustrating a method 300 for authorizing a reset action for a mobile device at a server remote from the mobile device. The method 300 may be performed by the authentication system 150 and, accordingly, is described herein merely by way of reference thereto. It will be appreciated that the method 300 may be performed on any suitable hardware.

In operation 310, the authentication system 150 receives, at the network server 140 remote from the mobile device 110, a token from the mobile device 110, such as a token transmitted from an operating system of the mobile device 110 to the server 140 after invocation of a master reset operation at the mobile device 110.

The token module 210 may receive the token from the mobile device 110, and extract an identifier for the mobile device 110 from the token. For example, the token module 110 may extract an international mobile subscriber identity (IMSI) for the mobile device 110, a network identifier provided to the device by the carrier network, a mobile subscription identification number (MS IN) for the mobile device 110, and so on.

In operation 320, the authentication system 150 identifies a status of the mobile device by comparing the extracted identifier to one or more databases associated with the server. For example, the authentication module 220 determines whether the identifier of the mobile device is included in the database of whitelisted devices 140 and/or included in the database of blacklisted devices 230. In some embodiments, the authentication system 15 may compare the extracted identifier to one or more databases associated with telecommunication networks provided by multiple different network carriers, such as global blacklist 130.

When the authentication system 150 determines the mobile device is whitelisted or otherwise authorized, method 300 proceeds to operation 330, and the system 150 transmits to the mobile device 110 an authorization token to the operating system of the mobile device 110 that causes the mobile device 110 to complete the master reset operation at the mobile device.

However, when the authentication system 150 determines the mobile device is blacklisted or otherwise compromised (e.g., the status of the mobile device 110 is stolen), method 300 proceeds to operation 340, and the system 150 transmits an authorization token to the operating system of the mobile device 110 that causes the mobile device 110 to request credentials from a user associated with the mobile device 110 before the mobile device 110 completes the master reset operation at the mobile device 110. The authorization token may, in some cases, cause the device to lock or otherwise prevent certain functionality of the mobile device 110 until the device is authorized by the system 150.

For example, the system 150 determines the mobile device 110 is or may be stolen, and causes the mobile device 110, during the reset operation, to prompt the user that invoked the reset operation to provide authorization credentials to verify he/she is an authorized user. The mobile device 110 may request the user to provide a network or subscriber identifier and password, social media credentials, and so on.

Figure 4:
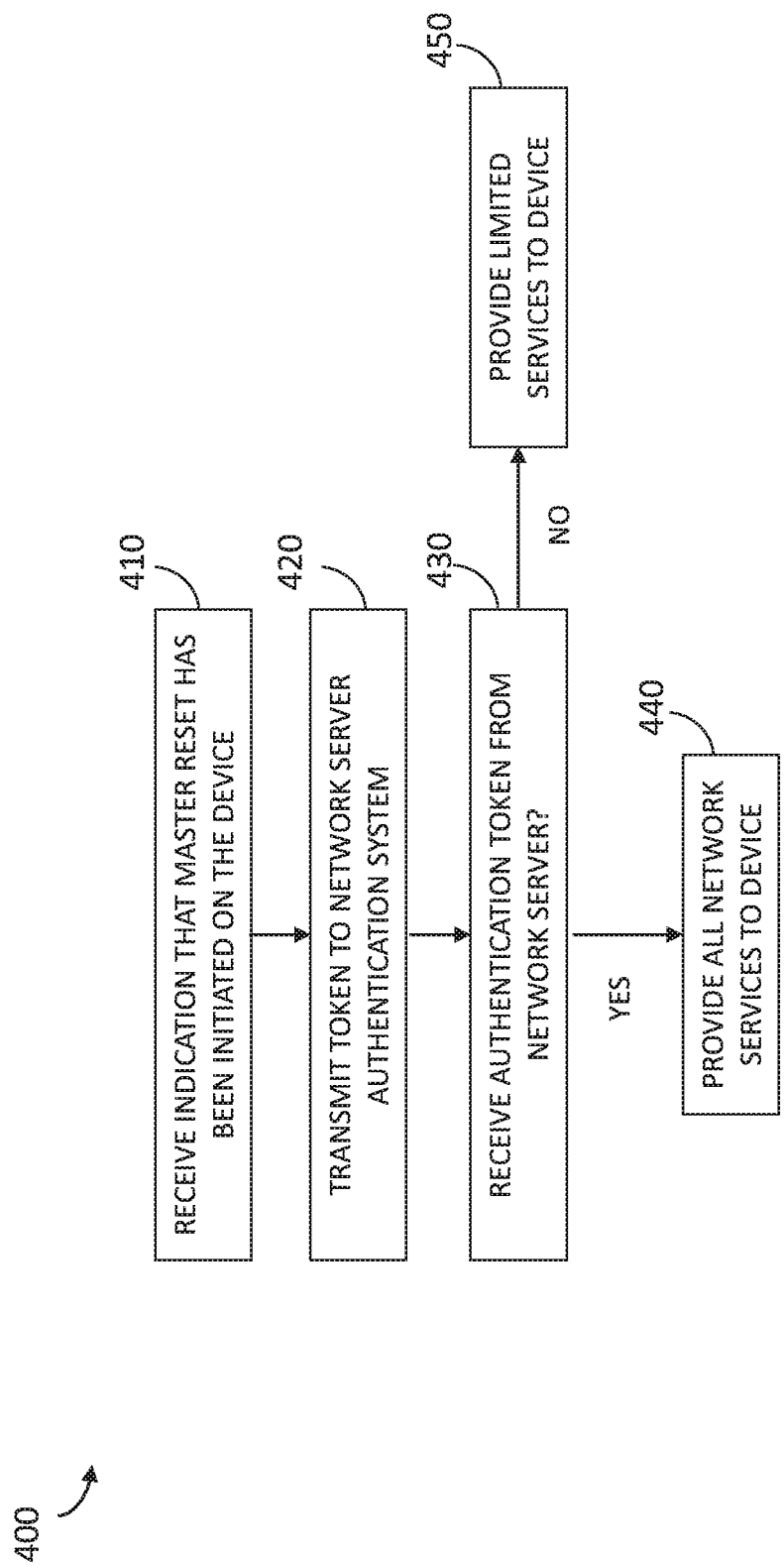
FIG. 4 is a flow diagram illustrating a method for performing a master reset by a mobile device.

As described herein, the systems and methods provide mobile devices with the capability of preventing unauthorized master resets using both local (device-specific) and network-based components. FIG. 4 is a flow diagram illustrating a method 400 for performing a master reset by a mobile device. The method 400 may be performed by the mobile device 110, and, accordingly, is described herein merely by way of reference thereto. It will be appreciated that the method 400 may be performed on any suitable hardware.

In operation 410, the mobile device 110 receives an indication of a master reset initiation. For example, the reset system 115 may receive a request from a user to reset the device back to its factory settings.

In operation 420, the mobile device 110 transmits a token to the authentication system 150 at the network server 140. For example, the reset system 115 may, via the operating system of the mobile device 110, generate a token that includes an identifier of the mobile device 110 and transmit the token to the authentication system 150.

In operation 430, the mobile device 110 determines whether an authorization token has been received. When an authorization token has been received, the mobile device 110, in operation 440, completes the master reset of the device and provides all network services to the device 110.

When an authorization token has not been received (or when the token indicates the device has been stolen), the mobile device 110, in operation 430, stops or prevents the master reset of the device, and provides limited network services to the device 110 (e.g., e911 services, only wireless services, and so on). The device 110 may present information to an associated user that indicates whether the device is authorized.

FIGS. 5A-5B are display diagrams illustrating example user interfaces presented by a mobile device during a master reset of the mobile device. As depicted in FIG. 5A, when a device has been authorized, the device, via user interface 500, displays a message to the user indicating the device is authorized to the network 120.

However, as depicted in FIG. 5B, when the device has not been authorized, the device, via user interface 550, displays a prompt for the user to provide additional credentials that verify the device 110 is possessed by an authorized user of the device 110. As described herein, the requested credentials may include network user identifiers, social media credentials, operating system credentials, and so on.

Thus, the systems and methods described herein enable a mobile device to transmit a token to a remote server in response to initiation of a master reset of the mobile device, and complete the master reset of the mobile device upon receiving an authorization token from the remote server. The network-based authentication enables the device to prevent unauthorized factory resets, providing an additional level of security with respect to security mechanism performed entirely at the device, among other benefits. While the system and method are generally described above as transmitting tokens, an alternative system and method avoids use of tokens and instead employs a network server that receives an identifier from the mobile device, and provides an approve or deny response, which the OS of the mobile device uses to initiate or deny a factory reset.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A method for preventing an unauthorized master reset of a mobile device, the method comprising:
   receiving, at a server remote from the mobile device, a token from the mobile device,
      wherein the token is transmitted in part from an operating system of the mobile device to the server after invocation of a master reset at the mobile device, and
      wherein the server is associated with a wireless network carrier that provides a telecommunication network for the mobile device;

extracting an identifier for the mobile device from the token;

identifying a status of the mobile device by comparing the extracted identifier to information stored within one or more databases associated with the server,
- wherein the one or more databases store information for subscribers of the wireless network carrier that provides the telecommunication network for the mobile device;
- wherein the information relates identifiers for mobile devices with status information for the mobile devices, and
- wherein the status information for the mobile devices indicates whether the mobile devices are stolen;

based on the identified status of the mobile device, automatically authorizing the mobile device to perform the master reset without requiring a user authentication; and transmitting to the mobile device an authorization token to the operating system of the mobile device based on the identified status of the mobile device,
- wherein the authorization token causes the mobile device to complete the master reset at the mobile device when the identified status of the mobile device is an authorized status; and
- wherein the authorization token causes the mobile device to prevent completion of the master reset operation at the mobile device when the identified status of the mobile device is a stolen status.

2. The method of claim 1, wherein identifying the status of the mobile device by comparing the extracted identifier to the information stored within the one or more databases associated with the server includes determining whether the identifier of the mobile device is included in a database of whitelisted devices or included in a database of blacklisted devices.

3. The method of claim 1, wherein transmitting to the mobile device the authorization token includes transmitting an authorization token that causes the mobile device to request credentials from a user associated with the mobile device before the mobile device completes the master reset at the mobile device.

4. The method of claim 1, wherein extracting the identifier for the mobile device from the token includes extracting an international mobile subscriber identity (IMSI) for the mobile device from the token.

5. The method of claim 1, wherein identifying the status of the mobile device by comparing the extracted identifier to the one or more databases associated with the server includes comparing the extracted identifier to one or more databases associated with the telecommunication network provided by multiple different network carriers.

6. The method of claim 1, further comprising:
receiving, prior to receiving the token from the mobile device, information indicating the mobile device has been stolen from a user associated with the mobile device; and
storing the identifier for the mobile device in a database of blacklisted devices;
wherein identifying the status of the mobile device by comparing the extracted identifier to the one or more databases associated with the server includes determining the status of the mobile device as stolen based on locating the identifier for the mobile device in the database of blacklisted devices.

7. A non-transitory computer-readable medium whose contents, when executed by a computing system, cause the computing system to perform a method for authenticating a reset mobile device to a telecommunication network, the method comprising:
receiving, at a server remote from a mobile device, a signal transmitted from a reset system of the mobile device,
- wherein the signal is transmitted from the mobile device to the server after invocation of a master reset at the mobile device, and
- wherein the server is associated with a network carrier that provides the telecommunication network for the mobile device;

obtaining an identifier for the mobile device from the signal;

identifying a status of the mobile device by comparing the identifier to information stored within one or more databases associated with the server,
- wherein the one or more databases store information relating identifiers for mobile devices with status information for the mobile devices that indicates whether the mobile devices are stolen, and
- wherein the one or more databases store information for subscribers of the network carrier that provides the telecommunication network for the mobile device;

based on the identified status of the mobile device, automatically authorizing the mobile device to perform the master reset without requiring a user authentication; and transmitting to the reset system of the mobile device an authorization signal for use in part by an operating system of the mobile device that is based on the identified status of the mobile device,
- wherein the reset system controls the master reset based on the authorization signal.

8. The non-transitory computer-readable medium of claim 7, wherein identifying the status of the mobile device by comparing the obtained identifier to the one or more databases associated with the server includes determining whether the identifier of the mobile device is included in a database of whitelisted devices or included in a database of blacklisted devices.

9. The non-transitory computer-readable medium of claim 7, wherein transmitting to the mobile device the authorization signal includes transmitting an authorization token to the operating system of the mobile device that causes the mobile device to complete the master reset at the mobile device.

10. The non-transitory computer-readable medium of claim 7, wherein transmitting to the mobile device the authorization signal includes transmitting an authorization token to the operating system of the mobile device that causes the mobile device to request credentials from a user associated with the mobile device before the mobile device completes the master reset at the mobile device.

11. The non-transitory computer-readable medium of claim 7, wherein obtaining the identifier for the mobile device includes extracting an international mobile subscriber identity (IMSI) for the mobile device from a received token.

12. The non-transitory computer-readable medium of claim 7, wherein identifying the status of the mobile device by comparing the obtained identifier to the one or more databases associated with the server includes comparing the obtained identifier to one or more databases associated with the telecommunication network provided by multiple different network carriers.

13. The non-transitory computer-readable medium of claim 7, further comprising:
   prior to receiving the signal from the mobile device, receiving information indicating the mobile device has been stolen from a user associated with the mobile device; and
   storing the identifier for the mobile device in a database of blacklisted devices;
   wherein identifying the status of the mobile device by comparing the identifier to the one or more databases associated with the server includes determining the status of the mobile device as stolen based on locating the identifier for the mobile device in the database of blacklisted devices.

14. A mobile device, comprising:
   a master reset system stored in memory that performs a master reset of the mobile device, the master reset system including:
      a token module that transmits a reset token to a remote server in response to an initiation of the master reset of the mobile device,
         wherein the remote server is part of a telecommunication network providing telecommunication services to the mobile device, and
            the token module that receives from the remote server an authorization token for the master reset of the mobile device based on the information stored in one or more databases of the telecommunication network; and
      an authentication module that completes the master reset of the mobile device after receiving the authorization token from the remote server, without providing a user authentication to the remote server.

15. The mobile device of claim 14, wherein the token module transmits the reset token to the remote server that includes an identifier for the mobile device.

16. The mobile device of claim 14, wherein an operating system of the mobile device transmits the reset token to the remote server.

17. The mobile device of claim 14, wherein the authentication module causes the mobile device to request credentials from a user associated with the mobile device before completing the master reset of the mobile device when the authorization token indicates that an identifier for the mobile device is located within a blacklist of stolen devices.

18. The mobile device of claim 14, wherein the authentication module completes the master reset of the mobile device when the authorization token indicates that an identifier for the mobile device is not located within a blacklist of stolen devices.

19. The mobile device of claim 14, wherein the authentication module completes the master reset of the mobile device when the authorization token indicates that an identifier for the mobile device is located within a whitelist of authenticated devices.

* * * * *